US007953545B2

(12) United States Patent
Jung et al.

(10) Patent No.: US 7,953,545 B2
(45) Date of Patent: May 31, 2011

(54) METHOD AND APPARATUS FOR PROVIDING TRAFFIC INFORMATION USING SCHEDULE REGISTRATION INFORMATION

(75) Inventors: Suk In Jung, Seoul (KR); Hyun Suk Min, Suwon-si (KR); Jin Won Kim, Seoul (KR); Kwang Soo Kim, Seoul (KR); Sung Chul Yang, Suwon-si (KR); Hye Jung Yang, Busan-si (KR); Jong Hyun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1113 days.

(21) Appl. No.: 11/717,779

(22) Filed: Mar. 13, 2007

(65) Prior Publication Data

US 2007/0265766 A1 Nov. 15, 2007

(30) Foreign Application Priority Data

May 13, 2006 (KR) ........................ 10-2006-0043178

(51) Int. Cl.
*G01C 21/00* (2006.01)

(52) U.S. Cl. .................................... 701/117; 340/995.1

(58) Field of Classification Search .................. 701/117, 701/202, 209, 210; 340/995.1, 995.11, 995.13–995.15, 995.18, 340/995.19, 995.23
See application file for complete search history.

(56) References Cited

U.S. PATENT DOCUMENTS

| | | | | |
|---|---|---|---|---|
| 6,911,918 | B2 * | 6/2005 | Chen | 340/995.13 |
| 2005/0090974 | A1 * | 4/2005 | Hirose | 701/208 |
| 2007/0208492 | A1 * | 9/2007 | Downs et al. | 701/117 |

FOREIGN PATENT DOCUMENTS

| | | |
|---|---|---|
| KR | 10-1999-0030774 | 5/1999 |

* cited by examiner

*Primary Examiner* — Dalena Tran
(74) *Attorney, Agent, or Firm* — The Farrell Law Firm, P.C.

(57) ABSTRACT

A method for providing traffic information includes registering a schedule containing the request details of a request for traffic information, receiving real-time traffic data for a time duration in advance of a traffic information provision time, and creating traffic information using the real-time traffic data at the traffic information provision time, and providing the traffic information. A related apparatus is also provided. The traffic information providing method and apparatus reduces an initial waiting duration for the provision of real-time traffic information.

37 Claims, 9 Drawing Sheets

METHOD AND APPARATUS FOR PROVIDING TRAFFIC INFORMATION USING SCHEDULE REGISTRATION INFORMATION

PRIORITY

This U.S. non-provisional application claims priority under 35 U.S.C. §119 from Korean Patent Application No. 2006-0043178, which was filed in the Korean Intellectual Property Office on May 13, 2006, the contents of which are incorporated herein by reference.

BACKGROUND OF THE INVENTION

1. Field of the Invention

The present invention relates generally to a method and apparatus for providing traffic information, and more particularly, to a method and apparatus for providing traffic information using prestored schedule registration information.

2. Description of the Related Art

In recent years, as an ever-increasing amount of passenger vehicles has led to increased traffic congestion and traffic accidents, various techniques have been developed that provide drivers with real-time traffic information regarding road traffic conditions, accidents and other factors affecting the flow of traffic.

Real-time traffic information may be broadcast by traffic reporters during delivery of FM broadcasting services, transmitted via FM broadcasting channels, and offered as a supplementary service by mobile communication companies. Also, drivers can be provided with traffic information via Digital Multimedia Broadcasting (DMB).

In particular, in providing real-time traffic information using DMB services, Transport Protocol Experts Group (TPEG) data is used. TPEG is a new standard protocol for delivering traffic and travel data. Use of DMB allows broadcasting of DMB data carrying TPEG data including real-time traffic data (e.g., information about traffic speed for each sections of roads and traffic incidents) and thus enables many DMB service subscribers to use real-time traffic information.

A DMB receiver receives TPEG data to create traffic information such as information for searching for and guiding possible routes, and the traffic information is provided to a user.

For example, a DMB receiving terminal receives all TPEG data being transmitted within a specific period and uses the received TPEG data to create traffic information to make it available to users.

Thus, the conventional DMB receiving terminal has to wait until all TPEG data corresponding to one period has been received. For example, when the transmission period of TPEG data is 30 seconds, the DMB receiving terminal must remain in a standby state for up to 30 seconds. This requires users to initially wait for some time before they can receive traffic information.

SUMMARY OF THE INVENTION

In order to solve the above problems, an object of the present invention is to provide a method and apparatus for providing real-time traffic information using schedule registration information that can reduce the initial time period users must wait before receiving real-time traffic information.

In order to achieve the above objects, according to an embodiment of the present invention, there is provided a method for providing traffic information, including registering a schedule having the request details of a request for traffic information, receiving real-time traffic data for a time duration in advance of a time of provision of traffic information specified in the request details, and creating traffic information using the real-time traffic data at the time of provision of the traffic information, and providing the traffic information.

The step of registering a schedule includes receiving schedule information containing the request details required to provide traffic information at a specified time and storing the schedule information, and setting a reception start time for receiving real-time traffic data to a time duration before the time of provision of traffic information specified in the request details for providing the traffic information.

The step of setting the reception start time includes requesting an input of the reception start time and setting a time that is input in response to the request to the reception start time, or requesting an input of a time duration and setting the time duration before the time of provision of the traffic information to the reception start time.

The step of registering a schedule further includes receiving and storing route guidance information containing an origin, destination and desired arrival time, and the reception start time is set using the route guidance information. The step of setting a reception start time includes creating and storing a route between the origin and the destination, calculating required travel duration for the created route, determining an expected departure time using a time that is the calculated travel duration before the desired arrival time, and determining the reception start time based on the expected departure time.

In determining the reception start time, half of the travel duration for the route is determined as traffic information preparation duration, and the reception start time is determined as a traffic information preparation duration time before the expected departure time.

The method further includes determining whether the remaining time duration between the current time and the expected departure time exceeds waiting duration, resetting the reception start time, if the remaining time duration exceeds the waiting duration, and suspending the reception of real-time traffic data until the current time is equal to the reset reception start time.

The step of determining whether the remaining time duration exceeds a waiting duration includes calculating the remaining time duration between the current time and the expected departure time, and comparing the remaining time duration with the waiting duration.

In resetting the reception start time, half of the time duration between the previously determined reception start time and the expected departure time is determined as a traffic information preparation duration, and the reception start time is reset to a the traffic information preparation duration time before the expected departure time.

The received real-time traffic data is represented by TPEG (Transport Protocol Experts Group) data using a TPEG protocol.

In addition, receiving real-time traffic data further includes receiving DMB (Digital Multimedia Broadcasting) data containing TPEG data representing the real-time traffic data using a TPEG protocol, and detecting the TPEG data from the DMB data.

According to the present invention, there is provided an apparatus for providing traffic information, including a schedule storage for storing schedule information containing request details of a request for traffic information, a receiver for receiving real-time traffic data for a time duration in advance of a time of provision of traffic information specified in the request details, a controller for controlling the receiver according to the request details and creating traffic information using the real-time traffic data at the time of provision of the traffic information, and an output unit for outputting the created traffic information.

The controller presets a reception start time for the real-time traffic data and controls the receiver to receive the real-time traffic data at the preset reception start time.

The controller receives route guidance information containing an origin, destination, and desired arrival time, stores the route guidance information in the schedule storage, calculates required travel duration for a route between the origin and the destination, determines an expected departure time using the desired arrival time and the travel duration, and determines the reception start time based on the expected departure time.

The controller determines half of the travel duration for the route as a traffic information preparation duration and determines the reception start time as a traffic information preparation duration time before the expected departure time.

The controller resets the reception start time if the remaining time duration between the current time and the expected departure time exceeds a waiting duration, and suspends the reception of real-time traffic data until the current time is equal to the reset reception start time.

The controller determines half the time duration between the previously determined reception start time and the expected departure time as a traffic information preparation duration, and resets the reception start time to a traffic information preparation duration time before the expected departure time.

The receiver receives the real-time traffic data represented by TPEG data using a TPEG protocol and receives DMB data containing TPEG data representing the real-time traffic data using a TPEG protocol and detects the TPEG data from the DMB data.

Preferably, the traffic information providing apparatus is a mobile communication terminal that can receive DMB data.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Hereinafter, preferred embodiments of the present invention are described in detail with reference to the accompanying drawings. The same reference numbers are used for the same or like components in the accompanying drawings. Detailed explanations for well-known functions and configurations incorporated herein may be omitted for the sake of clarity and conciseness.

Figure 1:
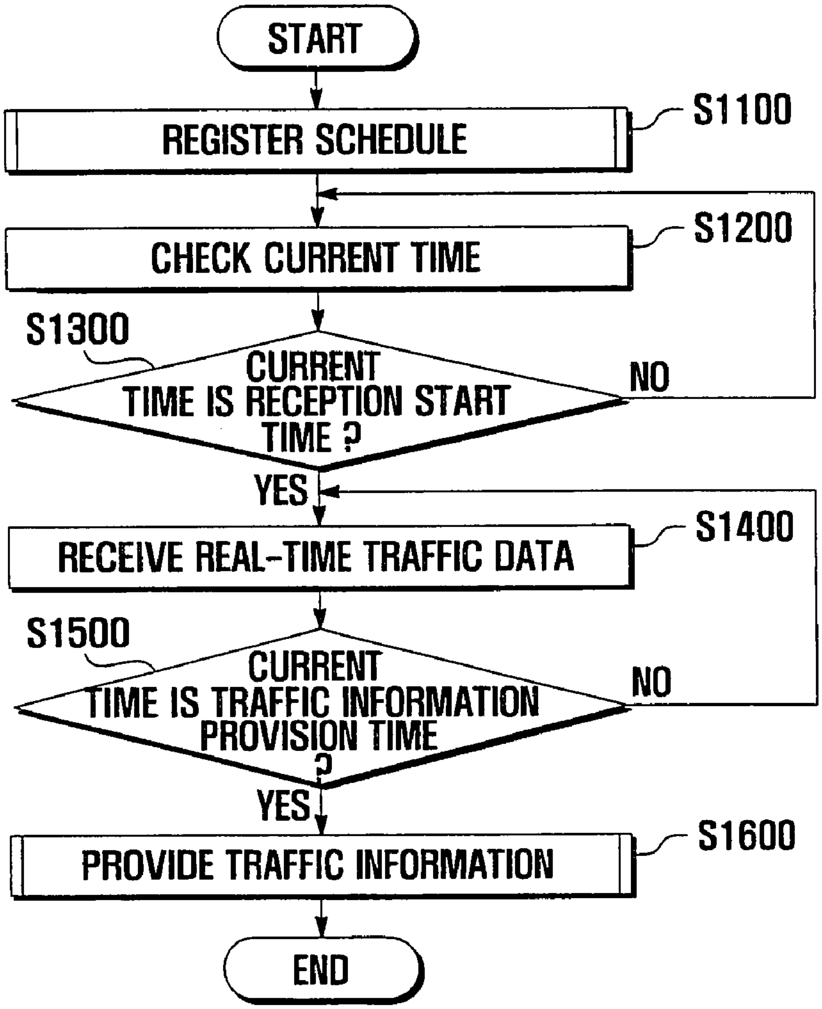
FIG. 1 is a flowchart illustrating a method for providing traffic information according to a first embodiment of the present invention.

FIG. 1 is a flowchart illustrating a method for providing traffic information according to of the first embodiment of the present invention.

Referring to FIG. 1, a schedule containing request details of a request for traffic information is registered (S1100). For example, the traffic information providing apparatus may store a schedule entered by a user. The request details of the request for traffic information include the type of traffic information (e.g. route guidance information, traffic information of a specific are a) that a user desires to receive and the time at which the user desires to receive the traffic information. The request details also contain a time at which the apparatus should start receiving real-time traffic data so that the data can provide the user with traffic information (hereinafter reception start time). The step S1100 of registering the schedule is described in more detail later with reference to FIG. 2.

When the schedule has been registered in step S1100, the traffic information providing apparatus receives real-time traffic data for a time duration before the time of provision of traffic information specified in the request details. More specifically, the traffic information providing apparatus checks the current time (S1200). If the current time is equal to the reception start time (S1300), the apparatus receives real-time traffic data (S1400). That is, the traffic information providing apparatus starts to receive real-time traffic data at the reception start time. The received real-time traffic data is preferably Transport Protocol Experts Group (TPEG) data being carried using a TPEG protocol. In order to obtain the TPEG data, the traffic information providing apparatus may preferably receive Digital Multimedia Broadcasting (DMB) data and detect the TPEG data contained in the DMB data.

After receiving the real-time traffic data in advance in step S1400, if the current time is equal to a traffic information provision time (S1500), the traffic information providing apparatus creates traffic information using the real-time traffic data and provides the traffic information to the user (S1600).

As described above, the traffic information providing method according to the first embodiment may reduce initial waiting duration incurred in the provision of real-time traffic information by receiving real-time traffic data before the desired time of provision of the real-time traffic information.

Figure 2:
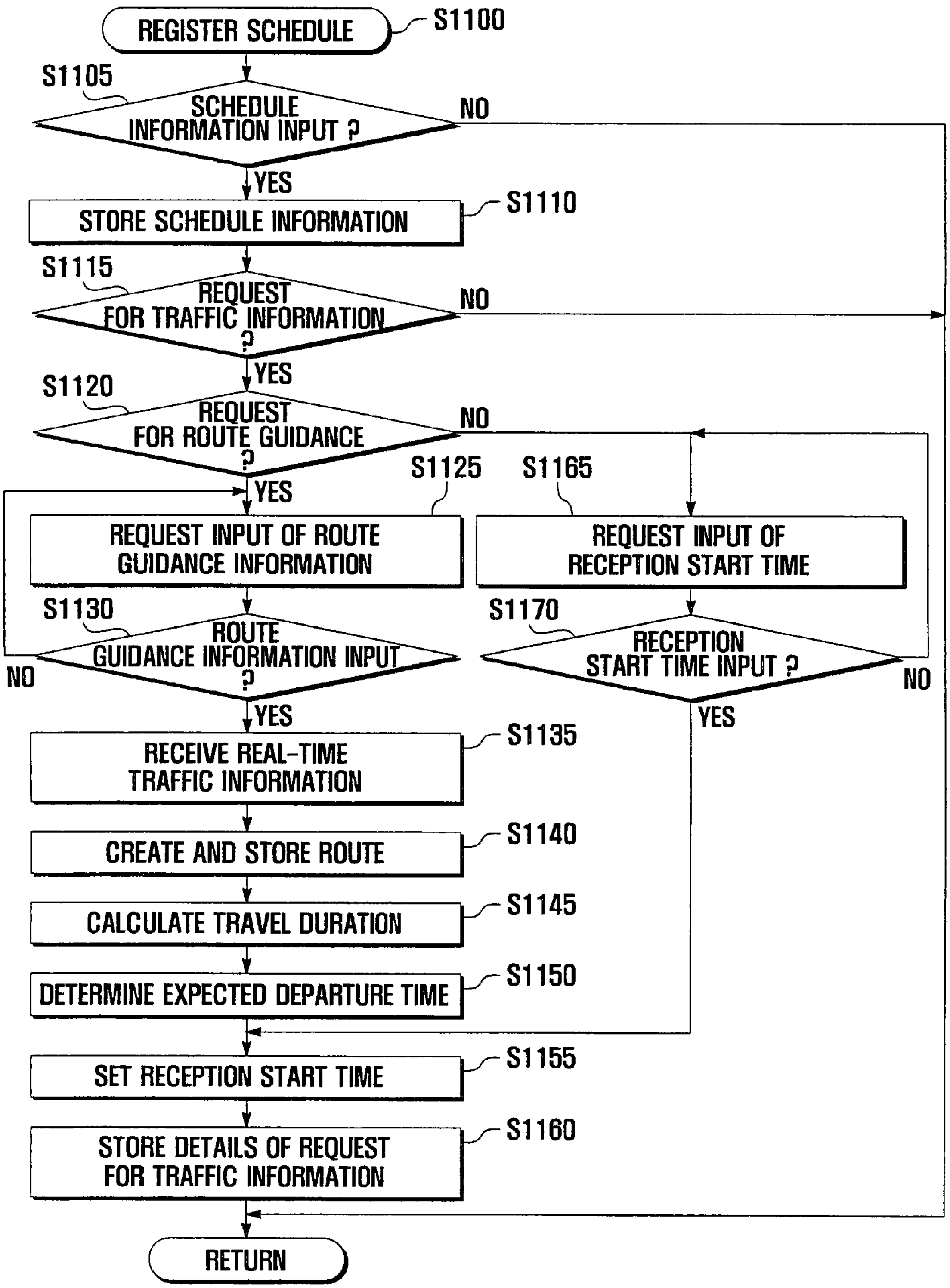
FIG. 2 is a detailed flowchart illustrating the step of registering schedule information in the method of FIG. 1.

FIG. 2 is a detailed flowchart illustrating step S1100 of registering the schedule in the method of FIG. 1.

Referring to FIG. 2, if schedule information is input (S1105), the traffic information providing apparatus stores the schedule information (S1110). If a request for traffic information is entered in the schedule (S1115), i.e. if the schedule contains request details, the traffic information providing apparatus performs an additional operation for providing traffic information. That is, the apparatus may set a reception start time for receiving real-time traffic data to a time duration before the time of provision of traffic information specified in the request details.

Next, the traffic information providing apparatus determines the type of requested traffic information by checking whether route guidance has been requested (S1120).

If the route guidance is requested in step S1120, the traffic information providing apparatus requests a user's input of the route guidance information (S1125). If the route guidance information is entered in response to the request for user's input (S1130), the apparatus determines the reception start time based on the route guidance information. That is, when an origin, a destination and a desired arrival time are entered in response to the request made in step S1125, the apparatus receives real-time traffic information (S1135) and then creates and stores a route between the origin and the destination (S1140). Alternatively, the route may be created using previously stored traffic information. When the route is established using the previously stored traffic information, step S1135 may preferably be omitted.

The traffic information providing apparatus also calculates a route travel duration for the created route (S1145). Various known techniques may be used to calculate the travel duration for a specific route. For example, in step S1145, the route travel duration is obtained by summing expected travel durations for all links contained in the route.

The traffic information providing apparatus determines an expected departure time as a time that is the calculated route travel duration before the desired arrival time (S1150). For example, if the desired arrival time is set to 2:30 and the route travel duration is 40 minutes, the expected departure time may be set to 1:50.

Alternatively, the expected departure time may be determined by subtracting the route travel duration and an allowance duration from the desired arrival time, considering an error in the travel duration calculation. Preferably, an expected departure time is initially determined, and then redetermined to a new expected departure time that is the allowance duration before the initially determined expected departure time, so that the user begins to travel at the redetermined time.

When the new expected departure time is used, if the desired arrival time is set to 2:30 and the route travel duration is 40 minutes, the new expected departure time may be set to 1:40 considering an allowance duration of 10 minutes.

When the expected departure time is determined in step S1150, the traffic information providing apparatus determines the reception start time based on the expected departure time (S1155).

The traffic information providing apparatus determines half of the route travel duration as a traffic information preparation duration. The apparatus determines the reception start time as a traffic information preparation duration time, before the expected departure time. Alternatively, an additional preparation duration may be set by considering additional factors that may affect traffic conditions. In this case, the reception start time is redetermined as a time that is the additional preparation duration in advance of the previously determined reception start time.

Figure 3:
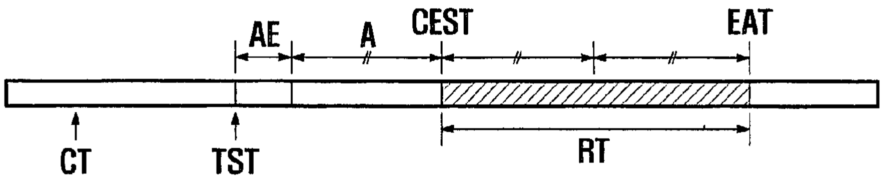
FIG. 3 is a timing diagram for describing a method for setting reception start time according to the present invention.

FIG. 3 is a timing diagram for describing a method for setting a reception start time according to the first embodiment of the present invention. In FIG. 3, CT and TST respectively denote current time and TPEG reception start time. RT denotes the required route travel duration. AE and A respectively represent additional preparation duration and traffic information preparation duration. CEST and EAT respectively denote current expected departure time and desired arrival time. Referring to FIG. 3, the CEST is set to a time that is duration RT before EAT. The TST is set to a time that is duration A, which is one-half of duration RT, and duration AE in advance of CEST.

Returning to FIG. 2, if route guidance is not requested in step S1120, the traffic information providing apparatus requests an input of the reception start time (S1165). If the reception start time is input in response to the request by the user (S1170), the reception start time is set (S1155). Alternatively, the traffic information providing apparatus may request a user to enter a time duration in order to determine the reception start time. When the time duration is so entered, the reception start time may be set to a time duration before the time of provision of traffic information. For example, if the user enters '30 minutes', the apparatus may set a time that is 30 minutes before the time of provision of traffic information as the reception start time.

When the reception start time is set in step S1155, the traffic information providing apparatus stores the request details including the reception start time (S1160).

Figure 4:
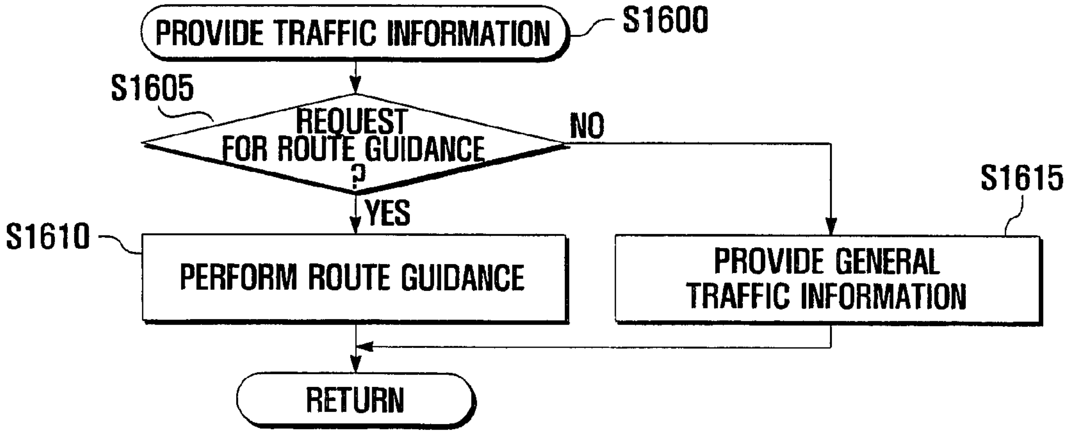
FIG. 4 is a flowchart illustrating the step of providing traffic information in the method of FIG. 1.

FIG. 4 is a flowchart illustrating the step S1600 of providing traffic information in the method of FIG. 1. Referring to FIG. 4, the traffic information providing apparatus determines whether route guidance is requested (S1605). If route guidance is requested, route guidance services are provided (S1610). Conversely, if the route guidance is not requested, general traffic information such as real-time traffic information for a specific are a is provided (S1615).

Figure 5:
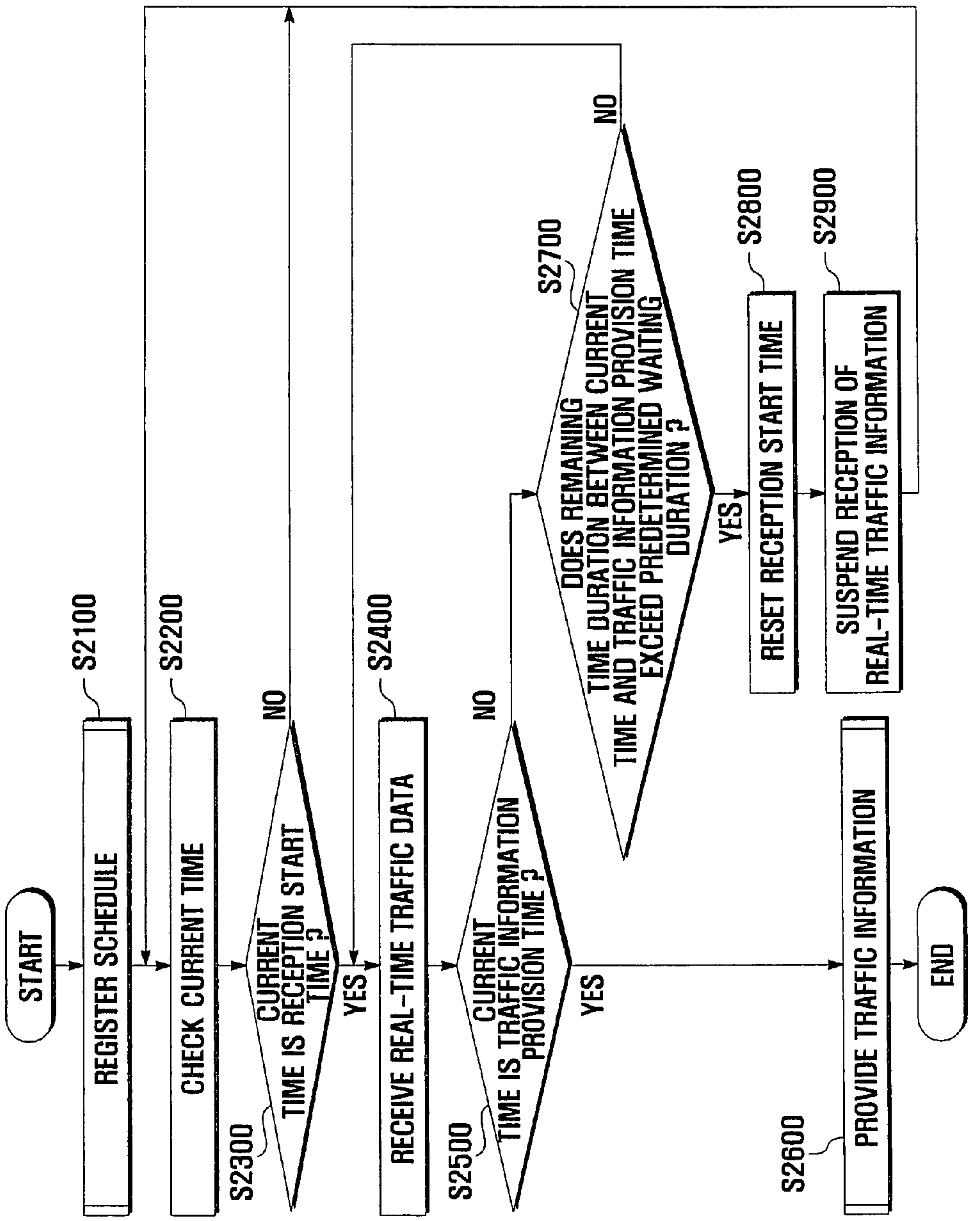
FIG. 5 is a flowchart illustrating a method for providing traffic information according to a second embodiment of the present invention.

FIG. 5 is a flowchart illustrating a method for providing traffic information according to a second embodiment of the present invention. Unlike in the first embodiment illustrated in FIG. 1, the method according to the second embodiment further includes resetting a reception start time when the difference between the current reception start time and the time of provision of traffic information is excessively large, i.e. when an excessive waiting time occurs therebetween.

Referring to FIG. 5, a schedule containing request details of a request for traffic information is registered (S2100). For example, the traffic information providing apparatus stores a schedule entered by a user. The request details include the type of traffic information (e.g. route guidance information, real-time traffic information of a specific are a) that a user desires to receive and the time at which the user desires to receive the traffic information. The request details also contain a time at which the apparatus should start to receive real-time traffic data which can be used to provide the user with traffic information. Because the schedule registration step S2100 is performed in the same manner as illustrated in FIG. 2, a detailed explanation thereof will not be provided here.

When the schedule has been registered in step S2100, the traffic information providing apparatus receives real-time traffic data for a time duration before the time of provision of traffic information specified in the request details. More specifically, the traffic information providing apparatus determines whether the current time (S2200) is equal to the reception start time (S2300). If so, the apparatus receives real-time traffic data (S2400). That is, the traffic information providing apparatus starts to receive real-time traffic data at the reception start time. The received real-time traffic data is TPEG data being carried using a TPEG protocol. In order to obtain the TPEG data, the traffic information providing apparatus may preferably receive DMB data and detect the TPEG data contained in the DMB data.

After receiving the real-time traffic data in advance in step S2400, if the current time is equal to a traffic information provision time (S2500), the traffic information providing apparatus creates traffic information using the real-time traffic data and provides the traffic information to the user (S2600).

If the current time is not equal to the traffic information provision time after the real-time traffic data is received in step S2500, the traffic information providing apparatus determines whether the remaining time duration between the current time and the traffic information provision time exceeds awaiting duration (S2700). To this end, the apparatus subtracts the current time from the expected departure time and compares the remaining time duration with the waiting duration.

If the remaining time duration is greater than the waiting duration in step S2700, the traffic information providing apparatus resets the reception start time (S2800) and suspends the reception of real-time traffic data until the current time is equal to the reset reception start time (S2900). In step S2800, the traffic information providing apparatus determines half of the time duration from the previously determined reception start time to the expected departure time as a traffic information preparation duration, and resets the reception start time to the traffic information preparation duration before the expected departure time.

Although not shown in FIG. 5, if the current time is already later than the expected departure time in step S2500, the traffic information providing apparatus searches for possible new routes and performs route guidance for a newly created route using the real-time traffic data. For example, the traffic information providing apparatus may receive a new desired arrival time from the user to recalculate a new expected departure time and reset a new reception start time using the new expected departure time.

Figure 6:
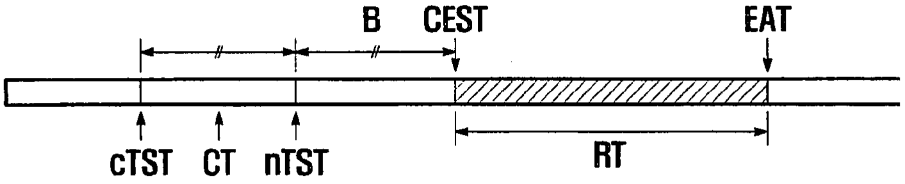
FIG. 6 is a timing diagram for describing a method for resetting reception start time according to the present invention.

FIG. 6 is a timing diagram for describing a method for resetting reception start time according to the second embodiment of the present invention. In FIG. 6, CT and cTST respectively denote current time and current TPEG reception start time. nTST and RT respectively denote new TPEG reception start time and required route travel duration. B represents traffic information preparation duration. CEST and EAT respectively denote current expected departure time and desired arrival time. Referring to FIG. 6, the CEST is set to a time that is duration RT before EAT. The time B corresponding to half the time from cTST to CEST is determined as the traffic information preparation duration. The time that is the traffic information preparation duration B in advance of CEST is reset as the nTST.

When the time that is the traffic information preparation duration B before the CEST is not later than the current time CT, the current TPEG reception start time cTST is not reset.

The traffic information providing method according to the second embodiment can reduce the amount of time wasted by receiving real-time traffic data unnecessarily or too far in advance.

Figure 7:
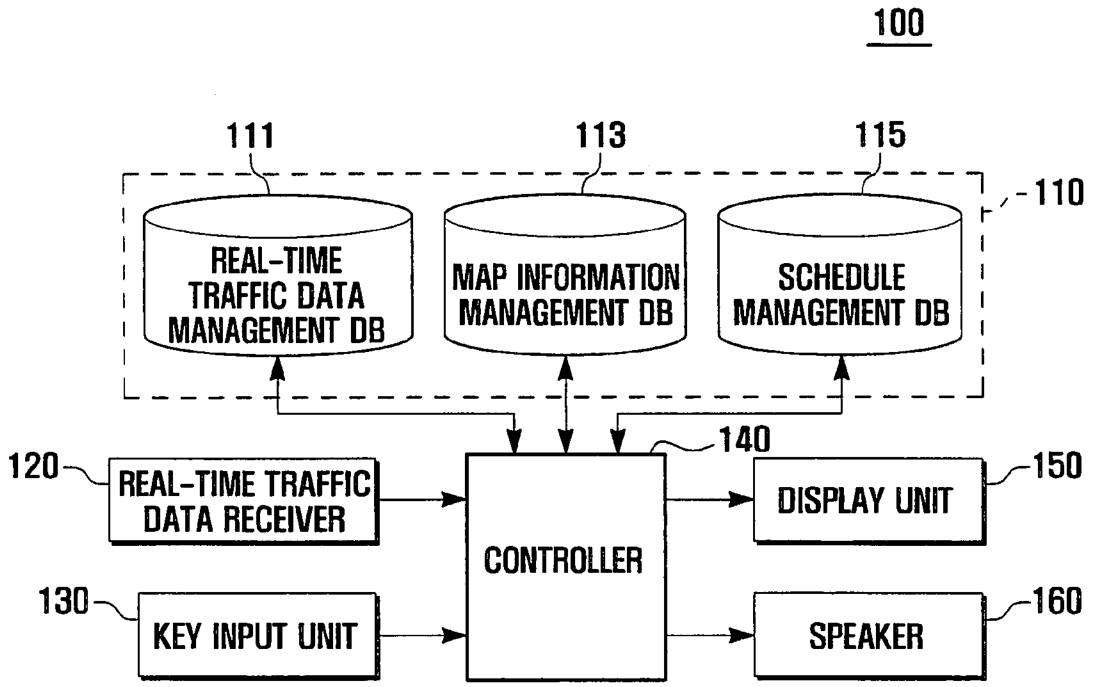
FIG. 7 is a block diagram of an apparatus for providing traffic information according to the present invention.

FIG. 7 is a block diagram of an apparatus for providing traffic information 100 according to the present invention.

Referring to FIG. 7, the traffic information providing apparatus 100 includes a storage 110, a real-time traffic data receiver 120, a key input unit 130, a controller 140, a display unit 150 and a speaker 160.

The storage 110 stores and manages information necessary to perform the operation of the apparatus 100, and includes a real-time traffic data management database (DB) 111, a map information management DB 113 and a schedule management DB 115.

The real-time traffic data management database (DB) 111 stores and manages real-time traffic data received through the real-time traffic data receiver 120. For example, the real-time traffic data may contain distance, real-time driving speed and required real-time travel duration for each section of a route.

The map information management DB 113 stores and manages electronic map information. For example, the electronic map information may include driving distance, average driving speed and directional information for each of a plurality of links created by segmenting all roads contained on the map.

The schedule management DB 115 stores and manages schedule information. In particular, the schedule information includes the request details of a request for traffic information. For example, the request details may contain the user's desired type of traffic information (e.g. route guidance information, real-time traffic information of a specific are a) and the desired time at which the user should receive the traffic information. The request details also contain a time at which the apparatus 100 should start to receive real-time traffic data so that the data can be used to provide the user with traffic information.

The controller 140 controls the real-time traffic data receiver 120 to receive real-time traffic data. The real-time traffic data receiver 120 receives DMB data containing TPEG data from a DMB network and detects the real-time traffic data from the TPEG data. The detected TPEG data is stored in the real-time traffic data management database (DB) 111 through the controller 140. It is noted that other types of data containing real-time traffic data may be received by the real-time traffic data receiver (120).

In particular, the real-time traffic data receiver 120 receives real-time traffic data for a duration in advance of the time of provision of traffic information specified in the request details that are contained in the schedule information.

The key input unit 130 is a user interface configured to generate signals input through a user's manipulation for controlling the operation of the traffic information providing apparatus 100. For example, the key input unit 130 generates signals in response to the user's manipulation for registering a schedule containing request details and delivers the signals to the controller 140.

The controller 140 controls the operation of the traffic information providing apparatus 100 according to the signals input through the key input unit 130 and previously stored operating programs. The controller 140 controls the real-time traffic data receiver 120 according to the request details in the schedule information stored in the schedule management DB 115 and creates traffic information using real-time traffic data that has been received via the real-time traffic data receiver 120 at the time of provision of traffic information specified in the request details.

To accomplish these functions, the controller 140 presets the time at which the receiver 120 starts to receive real-time traffic data, and controls the receiver 120 to receive the real-time traffic data at the preset reception start time. The step of setting the reception start time by the controller 140 is the same as described above with reference to FIGS. 2 and 3.

When the remaining time duration between the current time and the time of provision of traffic information exceeds awaiting duration, the controller 140 resets the reception start time and suspends the reception of real-time traffic data until the current time is equal to the reset reception start time. The step of resetting the reception start time by the controller 140 is the same as described above with reference to FIGS. 5 and 6.

The display unit 150 and the speaker 160 output information generated during the operation of the traffic information providing apparatus 100. The display unit 150 and the speaker 160 output video data and audio data, respectively.

The traffic information providing apparatus 100 is implemented as a mobile communication terminal that can receive DMB data.

As described above, the traffic information providing apparatus 100 according to the present invention may reduce initial waiting duration for providing real-time traffic information by receiving real-time traffic data in advance of the time of provision of traffic information and creating traffic information using the real-time traffic data.

FIGS. 8A-8F illustrate screens displaying the results of process steps performed using the apparatus of FIG. 7.

Figure 8A:
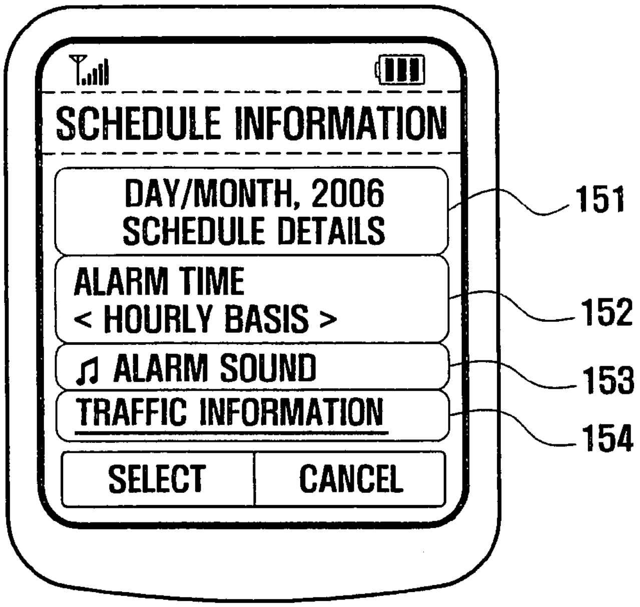
FIGS. 8A-8F illustrate screens displaying the results of process steps performed using the apparatus of FIG. 7.

FIG. 8A illustrates a screen for entering a schedule using the traffic information providing apparatus of FIG. 7. Referring to FIG. 8A, the screen is divided into a region 151 for inputting the date and time for a schedule, a region 152 for inputting the alarm time for notifying a user of the schedule, a region 153 for setting the type of alarm sound, and a region 154 for inputting detailed information necessary to receive traffic information.

Figure 8B:
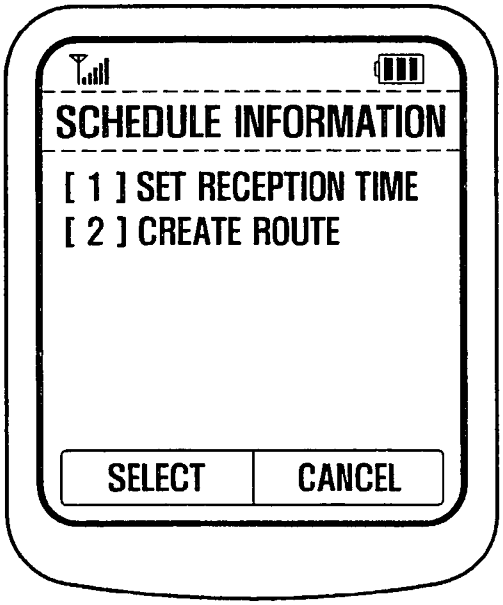

FIG. 8B illustrates a screen displayed when 'traffic information' is selected from the screen of FIG. 8A to enter the detailed information required to receive traffic information. Referring to FIG. 8B, when a user desires to receive real-time traffic information about a specific are a, line '[1] set reception time' is selected. Line '[2] establish route' is selected when the user desires to receive route guidance information.

Figure 8C:
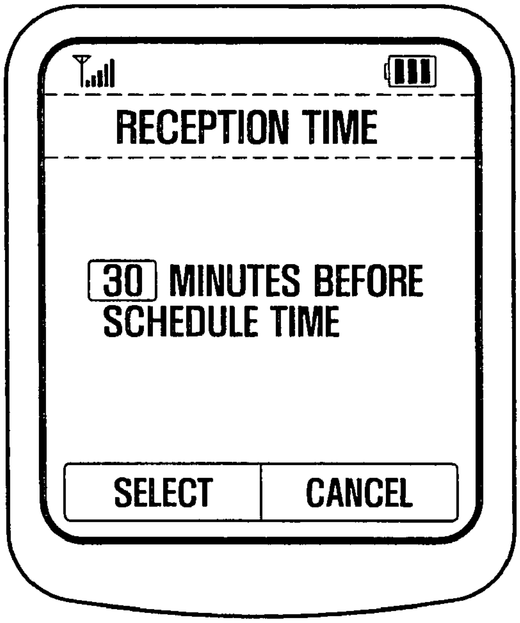

FIG. 8C illustrates a screen displayed when '[1] set reception time' is selected from the screen of FIG. 8B. In particular, FIG. 8C shows the screen for entering timing information for determining the reception start time, which is set to a time that is 30 minutes before the scheduled time.

Figure 8D:
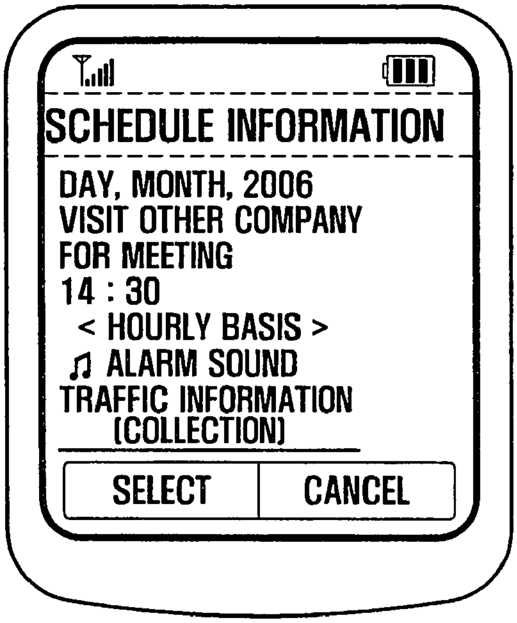

FIG. 8D illustrates a screen displayed when schedule input is completed by entering the reception start time on the screen of FIG. 8C. Referring to FIGS. 8C and 8D, because the alarm time is set to 14:30 and the reception start time is '30 minutes' before the scheduled time, the traffic information providing apparatus starts to receive real-time traffic data at 14:00. Referring to FIG. 8D, the traffic information providing apparatus informs the user that services for the provision of real-time traffic information about a specific are a have been selected for the corresponding schedule by indicating 'traffic information (collection)' at the bottom of the screen.

Figure 8E:
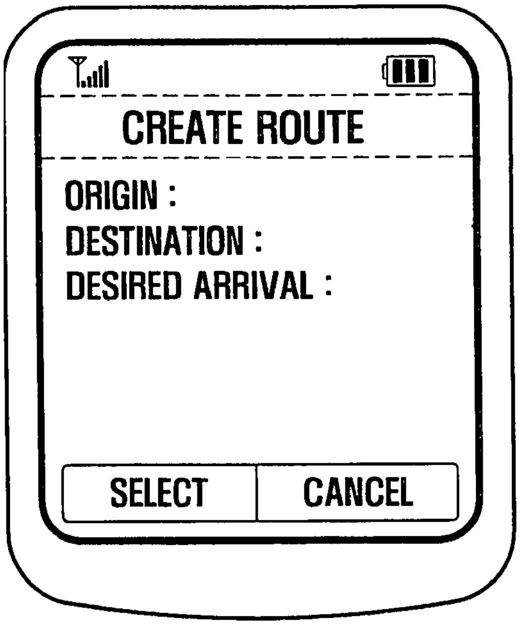

FIG. 8E illustrates a screen displayed when '[2] establish route' is selected from the screen of FIG. 8B. In particular, FIG. 8E shows the screen for entering route guidance information such as an origin, destination and desired arrival time.

Figure 8F:
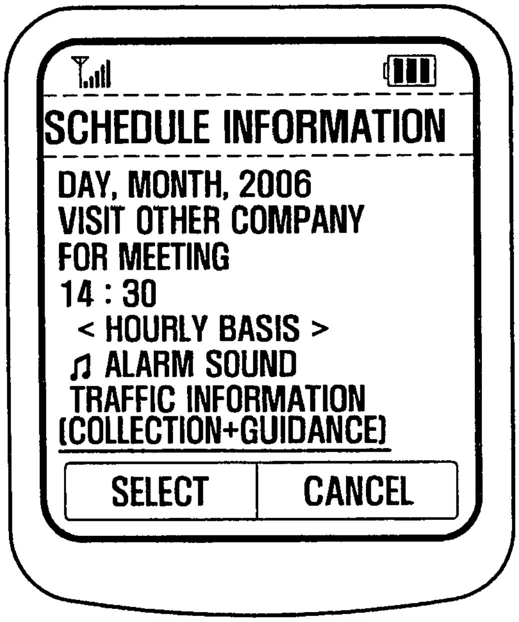

FIG. 8F illustrates a screen displayed when schedule input is completed by entering the route guidance information on the screen of FIG. 8E. Referring to FIG. 8F, the traffic information providing apparatus informs the user that route guidance services have been selected for the corresponding schedule by indicating 'traffic information (collection+guidance)' at the bottom of the screen.

As described above, the present invention can reduce an initial waiting duration for the provision of real-time traffic information by presetting the reception start time for real-time traffic data (e.g. TPEG data) using previously stored schedule registration information. This enables users to use real-time traffic information without having to initially wait for some time before they can receive traffic information.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for providing traffic information, comprising:

registering a schedule including request details of a request for traffic information;

receiving real-time traffic data for a time duration in advance of a traffic information provision time specified in the request details; and creating traffic information using the real-time traffic data at the traffic information provision time, and providing the traffic information.

2. The method of claim 1, wherein registering a schedule comprises:

receiving schedule information including the request details required to provide traffic information at a specified time and storing the schedule information; and setting a reception start time for receiving real-time traffic data to a time duration before the traffic information provision time specified in the request details for providing the traffic information.

3. The method of claim 2, wherein reception of the real-time traffic data starts at the reception start time.

4. The method of claim 2, wherein in setting the reception start time, an input of the reception start time is requested, and a time that is input in response to the request is set to the reception start time.

5. The method of claim 2, wherein in setting the reception start time, an input of a time duration is requested, and when the time duration is input, the time duration before the traffic information provision time is set to the reception start time.

6. The method of claim 2, wherein registering a schedule further comprises receiving and storing route guidance information including an origin, destination and desired arrival time.

7. The method of claim 6, wherein setting the reception start time comprises:

creating and storing a route between the origin and the destination;

calculating a required travel duration for the created route;

determining an expected departure time using the calculated travel duration before the desired arrival time; and determining the reception start time based on the expected departure time.

8. The method of claim 7, wherein in creating and storing the route, previously stored traffic data is used.

9. The method of claim 7, wherein the route is created and stored using receiving real-time traffic data.

10. The method of claim 7, wherein the expected departure time is determined as travel duration before the desired arrival time.

11. The method of claim 10, wherein determining the expected departure time further comprises redetermining the expected departure time as a time duration before the previously determined expected departure time.

12. The method of claim 7, wherein determining the reception start time comprises determining half of the travel duration for the route as a traffic information preparation duration and determining the reception start time as the traffic information preparation duration before the expected departure time.

13. The method of claim 12, wherein determining the reception start time further comprises:

setting an additional preparation duration considering additional factors that affect traffic conditions; and redetermining the reception start time as the additional preparation duration before the previously determined reception start time.

14. The method of claim 7, further comprising:

determining whether a remaining time duration between the current time and the expected departure time exceeds a waiting duration;

resetting, if the remaining time duration exceeds the waiting duration, the reception start time; and suspending the reception of real-time traffic data until the current time is equal to the reset reception start time.

15. The method of claim 14, wherein determining whether the remaining time duration exceeds a waiting duration comprises:

calculating the remaining time duration between the current time and the expected departure time; and comparing the remaining time duration with the waiting duration.

16. The method of claim 14, wherein in resetting the reception start time, half of the time duration between the previously determined reception start time and the expected departure time is determined as a traffic information preparation duration, and the reception start time is reset to a traffic information preparation duration before the expected departure time.

17. The method of claim 16, wherein the reception start time is reset when the traffic information preparation duration before the expected departure time is later than the current time.

18. The method of claim 2, further comprising:

determining whether a remaining time duration between the current time and the traffic information provision time exceeds a waiting duration;

resetting, if the remaining time duration exceeds the waiting duration, the reception start time; and suspending the reception of real-time traffic data until the current time is equal to the reset reception start time.

19. The method of claim 18, wherein determining whether the remaining time duration exceeds the waiting duration comprises:

calculating the remaining time duration between the current time and the traffic information providing time; and comparing the remaining time duration with the waiting duration.

20. The method of claim 18, wherein in resetting the reception start time, half of the time duration between the previously determined reception start time and the traffic information providing time is determined as a traffic information preparation duration, and the reception start time is reset to the traffic information preparation duration before the traffic information provision time.

21. The method of claim 20, wherein the reception start time is reset when the traffic information preparation duration before the expected departure time is later than the current time, the.

22. The method of claim 1, wherein the received real-time traffic data is represented by TPEG (Transport Protocol Experts Group) data using a TPEG protocol.

23. The method of claim 1, wherein receiving the real-time traffic data comprises:

receiving DMB (Digital Multimedia Broadcasting) data including TPEG data representing the real-time traffic data using a TPEG protocol; and detecting the TPEG data from the DMB data.

24. An apparatus for providing traffic information, the apparatus comprising:

a schedule storage for storing schedule information including request details of a request for traffic information;

a receiver for receiving real-time traffic data for a time duration in advance of a traffic information provision time specified in the request details;

a controller for controlling the receiver according to the request details and creating traffic information using the real-time traffic data at the t traffic information provision time; and an output unit for outputting the created traffic information.

25. The apparatus of claim 24, wherein the controller presets a reception start time for the real-time traffic data and controls the receiver to receive the real-time traffic data at the preset reception start time.

26. The apparatus of claim 25, wherein the controller requests an input of the reception start time, and sets the input reception start time.

27. The apparatus of claim 25, wherein the controller requests an input of a time duration, and when the time duration is input, sets the reception start time to the time duration before the traffic information provision time.

28. The apparatus of claim 25, wherein the controller receives route guidance information including an origin, destination and desired arrival time, stores the route guidance information in the schedule storage, calculates a required travel duration for a route between the origin and the destination, determines an expected departure time using the desired arrival time and the travel duration, and determines the reception start time based on the expected departure time.

29. The apparatus of claim 28, wherein the controller determines the expected departure time as a travel duration time before the desired arrival time.

30. The apparatus of claim 29, wherein the controller redetermines the expected departure time as a time duration before the previously determined expected departure time in response to an input of the time duration.

31. The apparatus of claim 28, wherein the controller determines half of the travel duration for the route as a traffic information preparation duration and determines the reception start time as a traffic information preparation duration time before the expected departure time.

32. The apparatus of claim 31, wherein the controller sets an additional preparation duration considering additional factors that affect traffic conditions and redetermines the reception start time as the additional preparation duration before the previously determined reception start time.

33. The apparatus of claim 28, wherein the controller resets the reception start time if a remaining time duration between the current time and the expected departure time exceeds a waiting duration, and suspends the reception of real-time traffic data until the current time is equal to the reset reception start time.

34. The apparatus of claim 33, wherein the controller determines half of the time duration between the previously determined reception start time and the expected departure time as a traffic information preparation duration and resets the reception start time to the traffic information preparation duration before the expected departure time.

35. The apparatus of claim 24, wherein the receiver receives the real-time traffic data represented by TPEG (Transport Protocol Experts Group) data using a TPEG protocol.

36. The apparatus of claim 35, wherein the receiver receives DMB (Digital Multimedia Broadcasting) data including TPEG data representing the real-time traffic data using a TPEG protocol and detects the TPEG data from the DMB data.

37. The apparatus of claim 24, wherein the apparatus is a mobile communication terminal that receives Digital Multimedia Broadcasting (DMB) data.

* * * * *